United States Patent
Yamazaki

(10) Patent No.: US 11,004,218 B2
(45) Date of Patent: May 11, 2021

(54) THREE-DIMENSIONAL IMAGE PROCESSING DEVICE AND THREE-DIMENSIONAL IMAGE PROCESSING METHOD FOR OBJECT RECOGNITION FROM A VEHICLE

(71) Applicant: HITACHI, LTD., Tokyo (JP)

(72) Inventor: Kazuyoshi Yamazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/282,351

(22) Filed: Feb. 22, 2019

(65) Prior Publication Data
US 2019/0287255 A1   Sep. 19, 2019

(30) Foreign Application Priority Data
Mar. 15, 2018 (JP) .............................. JP2018-48062

(51) Int. Cl.
 *G06K 9/00* (2006.01)
 *G06T 7/285* (2017.01)
 (Continued)

(52) U.S. Cl.
 CPC .............. *G06T 7/285* (2017.01); *B60R 11/04* (2013.01); *G06K 9/00805* (2013.01); *G06T 7/11* (2017.01);
 (Continued)

(58) Field of Classification Search
 CPC ........... G06T 7/593; G06T 2207/10012; G06T 2207/10021; G06T 7/285; G06T 7/579; G06T 7/70; G06T 7/73; G06T 7/77; G06T 7/55; G06T 2200/04; G06T 2207/10016; G06T 2207/10028; G06T 1/0007; G06T 7/292; H04N 13/271; H04N 2005/2255;
 (Continued)

(56) References Cited

U.S. PATENT DOCUMENTS 6,229,562 B1 * 5/2001 Kremen ............... G02B 5/1885
348/51
8,611,604 B2 * 12/2013 Fujiyoshi .............. G01S 7/4802
382/103

(Continued)

FOREIGN PATENT DOCUMENTS

JP    2010-256296 A    11/2010

OTHER PUBLICATIONS

Japanese Office Action received in corresponding Japanese Application No. 2018-048062 dated Dec. 22, 2020.

*Primary Examiner* — Guillermo M Rivera-Martinez
(74) *Attorney, Agent, or Firm* — Mattingly & Malur, PC

(57) ABSTRACT

A three-dimensional image processing device includes: an input unit configured to acquire a first taken image and a second taken image respectively from a first imaging unit and a second imaging unit; and a stereo processing unit configured to execute stereo processing and then outputs a range image, for a common part where an imaging region of the first taken image and an imaging region of the second taken image have an overlap with each other, an imaging direction of the first imaging unit and an imaging direction of the second imaging unit are set toward a horizontal direction, and both side parts of the imaging region of the first imaging unit and both side parts of the imaging region of the second imaging unit are set as common parts.

8 Claims, 13 Drawing Sheets

(51) Int. Cl.
  *B60R 11/04* (2006.01)
  *G06T 7/215* (2017.01)
  *G06T 7/11* (2017.01)
  *G06T 7/174* (2017.01)

(52) U.S. Cl.
  CPC .............. *G06T 7/174* (2017.01); *G06T 7/215* (2017.01); *B60R 2300/107* (2013.01); *B60R 2300/303* (2013.01); *G06T 2207/10012* (2013.01); *G06T 2207/10028* (2013.01); *G06T 2207/30261* (2013.01)

(58) Field of Classification Search
  CPC ...... H04N 7/181; H04N 13/204; G01C 11/02; G06K 9/00791; G06K 9/00201; G06K 9/32; G06K 9/6212; G06K 2209/40; G06K 9/00624; G06K 9/00805; B60R 2300/105; B60R 2300/303; G02B 2027/0138; G02B 7/365; G02B 26/101; G03H 1/26; A61B 1/0005; G01B 11/25; G01B 11/03; G01S 17/894; G06F 3/0346
  USPC .............. 348/46, 47, 48; 382/141, 154, 286
  See application file for complete search history.

(56) References Cited

U.S. PATENT DOCUMENTS

| | | | |
|---|---|---|---|
| 9,215,441 B2* | 12/2015 | Asano | G06T 5/002 |
| 2004/0240754 A1* | 12/2004 | Smith | G01B 11/25 |
| | | | 382/286 |
| 2006/0193509 A1* | 8/2006 | Criminisi | G06K 9/00241 |
| | | | 382/154 |
| 2006/0291719 A1* | 12/2006 | Ikeda | G01B 11/24 |
| | | | 382/154 |
| 2011/0221869 A1* | 9/2011 | Yamaya | G06T 7/593 |
| | | | 348/47 |
| 2012/0056990 A1* | 3/2012 | Yoshie | H04N 13/128 |
| | | | 348/46 |
| 2012/0178469 A1* | 7/2012 | Grzechnik | G01C 21/20 |
| | | | 455/456.1 |
| 2013/0107008 A1* | 5/2013 | Muninder | H04N 13/221 |
| | | | 348/46 |
| 2013/0147918 A1* | 6/2013 | Kakuko | H04N 13/218 |
| | | | 348/46 |
| 2013/0342659 A1* | 12/2013 | Onishi | G06T 7/70 |
| | | | 348/47 |
| 2014/0043444 A1* | 2/2014 | Haraguchi | G06T 3/0062 |
| | | | 348/47 |
| 2014/0049612 A1* | 2/2014 | Ishii | G06T 7/593 |
| | | | 348/46 |
| 2015/0109420 A1* | 4/2015 | Masuda | G01B 11/245 |
| | | | 348/47 |
| 2015/0213588 A1* | 7/2015 | Wang | G06T 7/85 |
| | | | 348/47 |
| 2015/0249821 A1* | 9/2015 | Tanizumi | B66C 13/00 |
| | | | 348/46 |
| 2015/0269737 A1* | 9/2015 | Lam | H04N 13/111 |
| | | | 382/154 |
| 2015/0355102 A1* | 12/2015 | Kido | G01N 21/8806 |
| | | | 348/46 |
| 2018/0027224 A1* | 1/2018 | Javidnia | H04N 13/271 |
| | | | 382/154 |
| 2018/0058044 A1* | 3/2018 | Deguchi | E02F 9/261 |
| 2018/0060465 A1 | 3/2018 | Tocher et al. | |
| 2018/0080197 A1* | 3/2018 | Deguchi | H04N 13/243 |
| 2018/0189975 A1* | 7/2018 | Inada | G01C 3/085 |
| 2019/0297283 A1* | 9/2019 | Douady | H04N 19/597 |
| 2019/0333237 A1* | 10/2019 | Javidnia | G06K 9/6215 |
| 2020/0302657 A1* | 9/2020 | Shimazu | B60R 1/00 |

* cited by examiner

FIG. 3
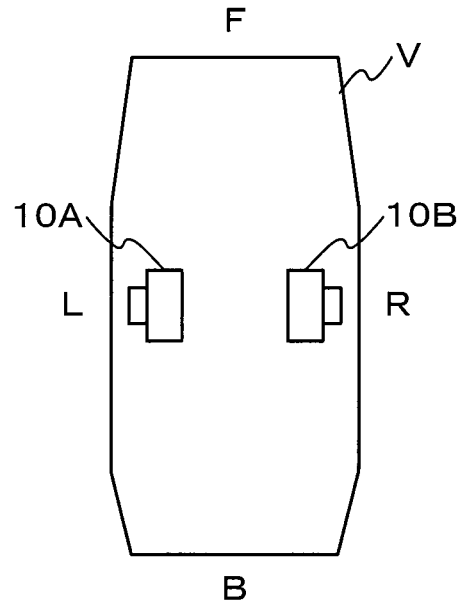
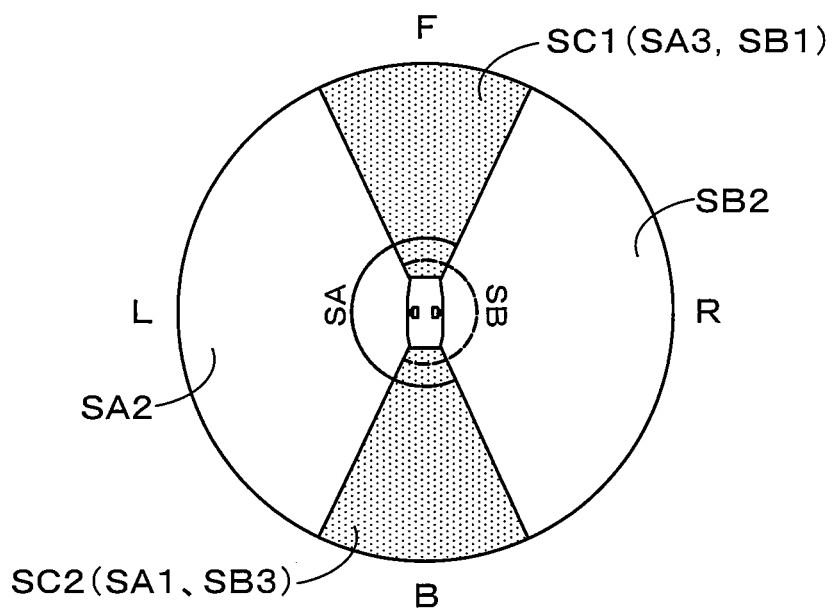

FIG. 10
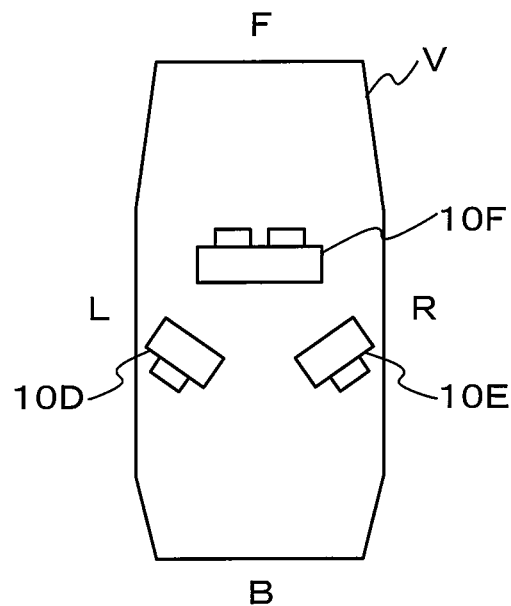
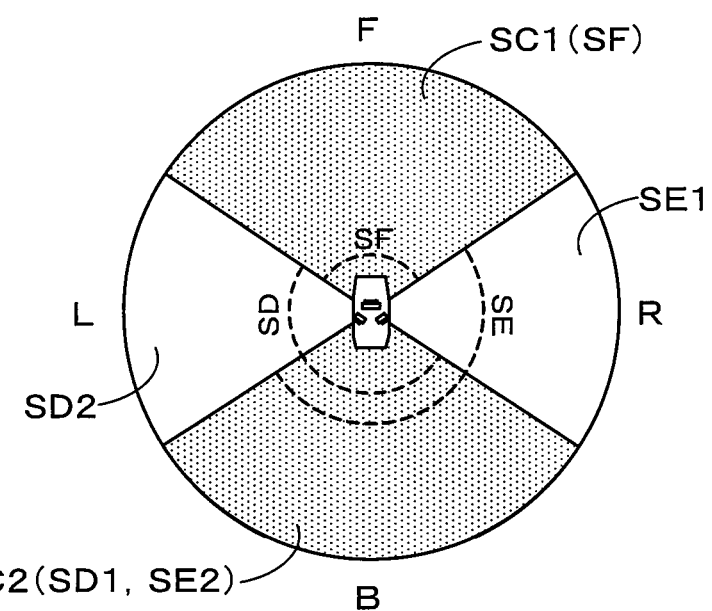

FIG. 11
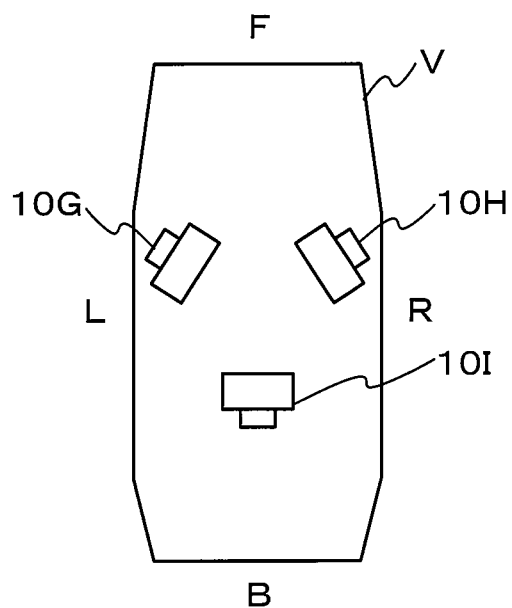
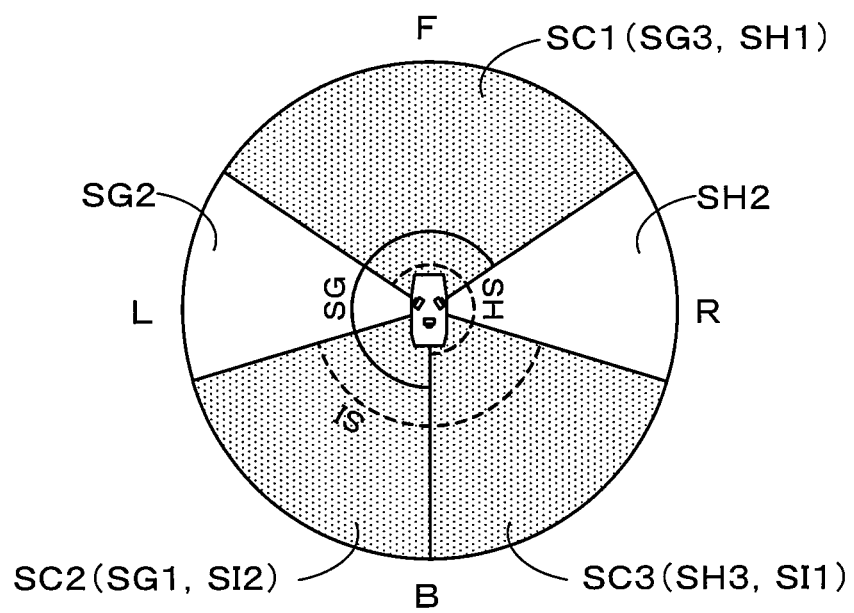

FIG. 12
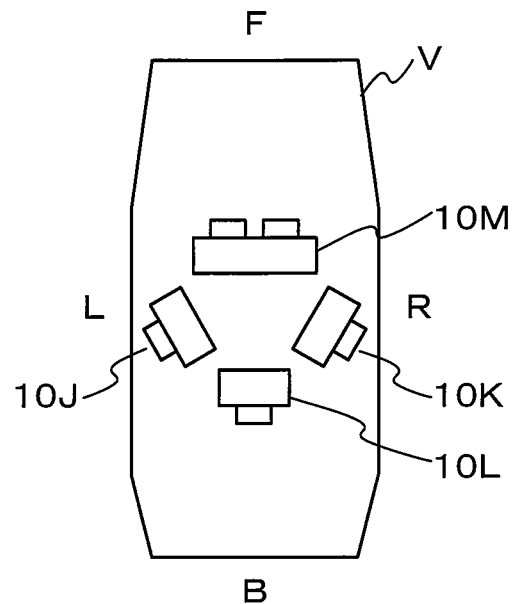
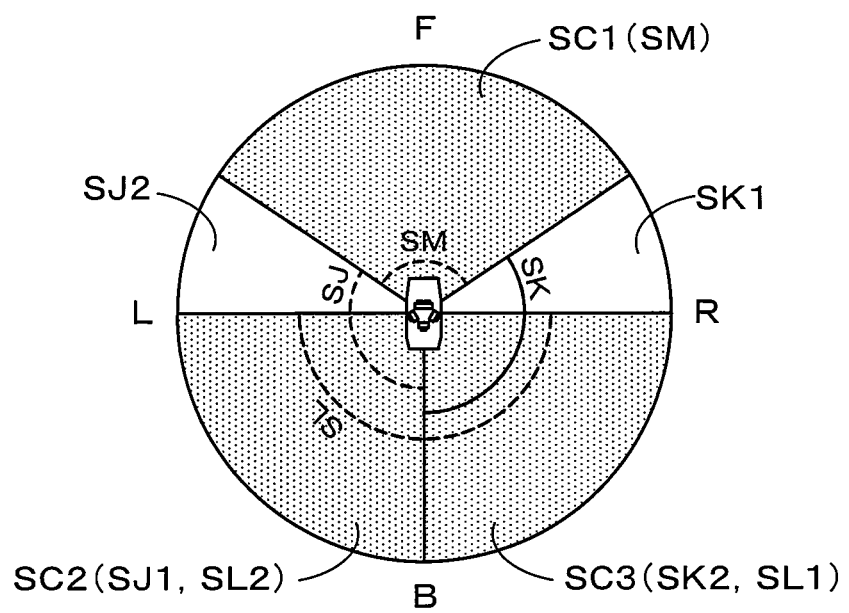

FIG. 13
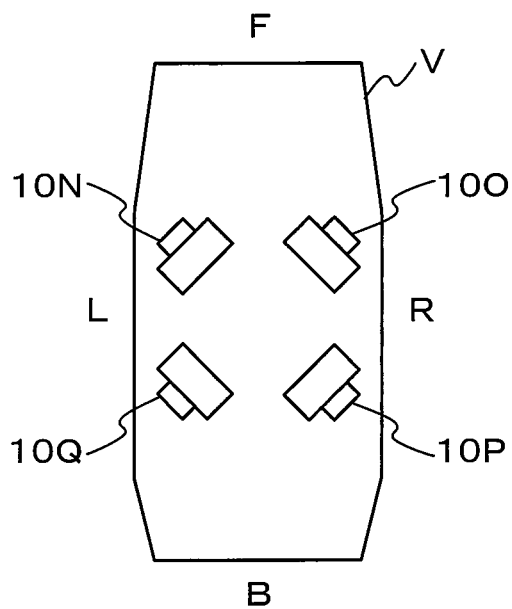
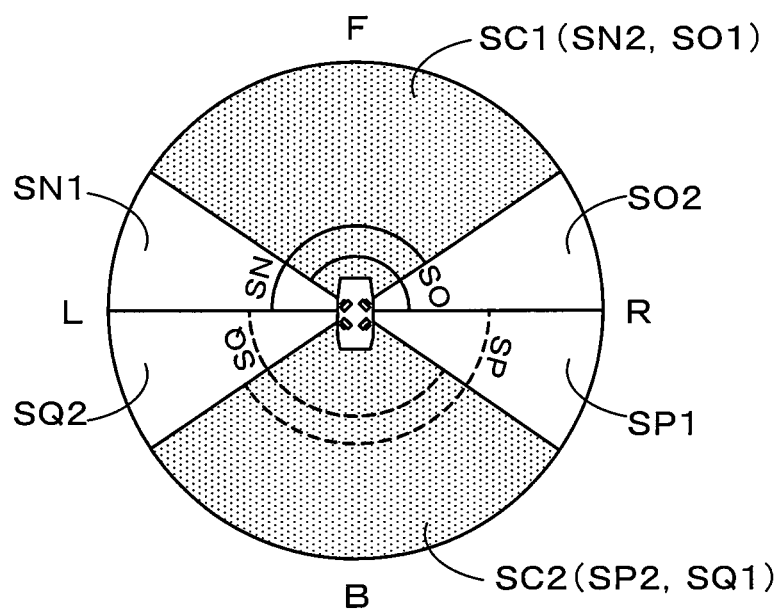

THREE-DIMENSIONAL IMAGE PROCESSING DEVICE AND THREE-DIMENSIONAL IMAGE PROCESSING METHOD FOR OBJECT RECOGNITION FROM A VEHICLE

This application claims the priority based on the Japanese Patent Application No. 2018-48062 filed on Mar. 15, 2018. The entire contents of which are incorporated herein by reference for all purpose.

BACKGROUND

Technical Field

The present invention relates to a three-dimensional image processing device and a three-dimensional image processing method.

Related Art

Self-driving cars require techniques for sensing in all 360-degree directions of the cars, in order to recognize objects such as obstacles, people, and roads in horizontal peripheries of the cars (in particular, in directions from car front to back and from car side to side).

Methods for sensing in all directions include, for example, a method of providing cars with various and many sensing devices, including a radar, a laser scanner, a camera, and the like, and using data from the sensing devices.

JP 2010-256296 A discloses a device for space imaging in all direction around the Z axis with an optical system composed of a camera unit and a mirror unit disposed in the Z axis direction.

SUMMARY

However, providing cars with various and many sensing devices for sensing in all directions will cause an increase in manufacturing cost due to the increased number of devices, the complicated designs, and the like.

In a case in which the technique in JP 2010-256296 A is used, the horizontal periphery of a car will be projected as an annular image onto an image sensor. More specifically, for sensing in all directions, there is a need to prepare a quadrangle image sensor that has an area capable of projecting the annular image. This need will cause an increase in manufacturing cost.

An object of the present invention is to achieve three-dimensional sensing of a horizontal periphery at low cost.

The present application encompasses more than one means for solving at least part of the problem mentioned above, and an example of the means will be given as follows.

A three-dimensional image processing device includes: an input unit configured to acquire a first taken image and a second taken image respectively from a first imaging unit and a second imaging unit; and a stereo processing unit configured to execute stereo processing and then output a range image, for a common part where an imaging region of the first taken image and an imaging region of the second taken image have an overlap with each other, an imaging direction of the first imaging unit and an imaging direction of the second imaging unit are set toward a horizontal direction, a central part of an imaging region of the first imaging unit and a central part of an imaging region of the second imaging unit are set as non-common parts that have no overlap with each other, and both side parts of the imaging region of the first imaging unit and both side parts of the imaging region of the second imaging unit are set as common parts.

According to the present invention, three-dimensional sensing of the horizontal periphery can be achieved at low cost.

Objects, configurations, and advantageous effects other than the foregoing will be evident from the following description of embodiments.

BRIEF DESCRIPTION OF DRAWINGS

FIG. 3 is a diagram for explaining examples of the installation and imaging regions of two imaging units;

FIG. 10 is a diagram for explaining examples of the installation and imaging regions of multiple imaging units according to a second embodiment of the present invention;

FIG. 11 is a diagram for explaining examples of the installation and imaging regions of multiple imaging units according to a third embodiment of the present invention;

FIG. 12 is a diagram for explaining examples of the installation and imaging regions of multiple imaging units according to a fourth embodiment of the present invention; and FIG. 13 is a diagram for explaining examples of the installation and imaging regions of multiple imaging units according to a fifth embodiment of the present invention.

DETAILED DESCRIPTION

Several embodiments of the present invention will be described below with reference to the drawings.

First Embodiment

Figure 1:
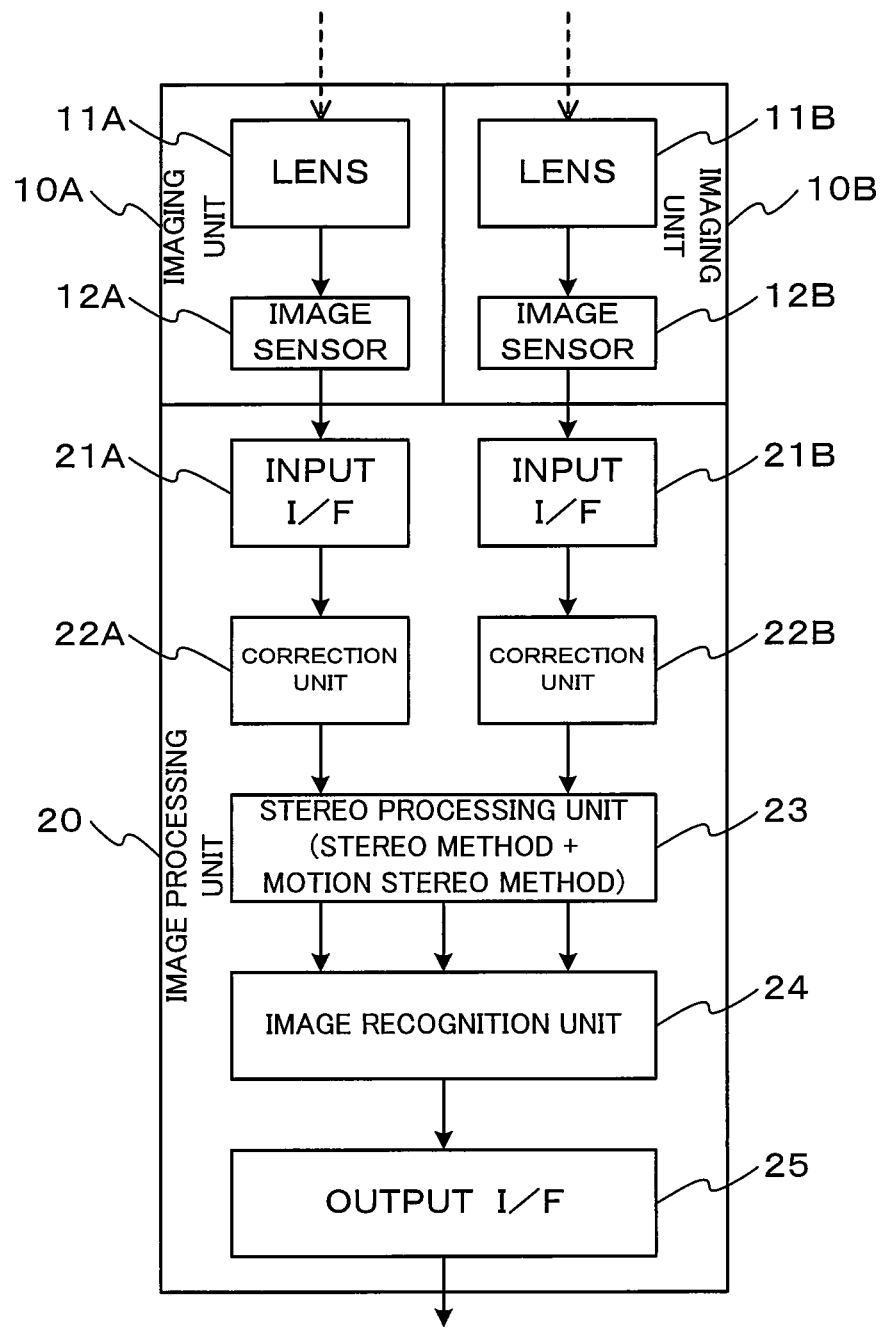
FIG. 1 is a block diagram illustrating a configuration example of a three-dimensional image processing device according to a first embodiment of the present invention.

FIG. 1 is a block diagram illustrating a configuration example of a three-dimensional image processing device 1 according to a first embodiment of the present invention.

The three-dimensional image processing device 1 according to the present embodiment is installed, for example, in a vehicle such as an automobile and a motorcycle, for taking at least an image of a horizontal vehicle periphery. The horizontal vehicle periphery refers to, for example, when the height direction of the vehicle is regarded as a vertical direction, all directions perpendicular to the axis in the vertical direction. More specifically, the horizontal periphery corresponds to all 360-degree directions, including from vehicle front to back and from vehicle side to side.

In general, a self-driving vehicle that has a self-driving function (which is not limited to fully automatic driving) is equipped with a control unit such as an ECU (Electronic Control Unit) for controlling the detection of an object, the steerage of the vehicle, the acceleration and deceleration of the vehicle, and the like. The three-dimensional image processing device 1 is connected to the control unit directly or communicably through an in-vehicle communication network such as CAN (Control Area Network), thereby outputting, to the control unit, information such as a taken image, a range image generated based on a taken image, and an image recognition processing result.

The three-dimensional image processing device 1 includes an imaging unit 10A, an imaging unit 10B, and an image processing unit 20.

The imaging unit 10A, which is a monocular camera, includes a lens 11A and an image sensor 12A. The imaging unit 10B, which is also a monocular camera, includes a lens 11B and an image sensor 12B.

The lenses 11A, 11B are fish-eye lens systems, which have an angle of view in excess of 180 degrees. According to the present embodiment, a stereographic projection method (2f·tan θ/2) can be adopted for the projection method of the lenses 11A, 11B.

Figure 2:
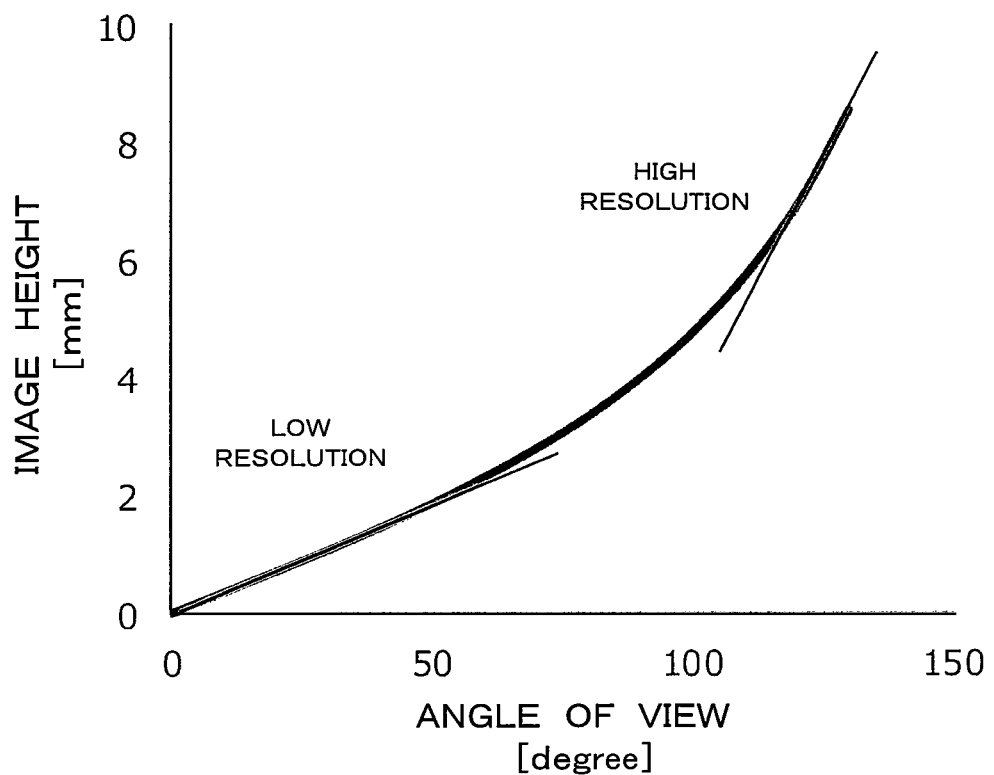
FIG. 2 is a diagram for explaining an example of lens characteristics.

FIG. 2 is a diagram for explaining a characteristic example of the lenses 11A, 11B, where the horizontal axis indicates an angle of view (degree), whereas the vertical axis indicates an image height (mm). The slope of the graph in FIG. 2 is increased as the angle of view is increased. From here onwards, it is determined that a higher-resolution image is obtained at outer sides of the light-receiving surfaces of the image sensors 12A, 12B. It is to be noted that the present embodiment and other embodiments as described later will be described in accordance with the stereographic projection method, but the present invention can achieve a similar effect to those of the respective embodiments, as long as a lens is used which has a high angle of view and achieves a high resolution.

Referring to FIG. 1, the image sensor 12A receives, at the light-receiving surface thereof, light passing through the lens 11A, then converts the light to taken image signals, and outputs the signals to an input I/F (interface) 21A of the image processing unit 20. The image sensor 12B receives, at the light-receiving surface thereof, light passing through the lens 11B, then converts the light to image signals, and outputs the signals to an input I/F 21B of the image processing unit 20.

The image processing unit 20 serves as a unit that applies image processing to taken image signals output from the imaging units 10A, 10B. The image processing unit 20 includes the input I/F 21A, the input I/F 21B, a correction unit 22A, a correction unit 22B, a stereo processing unit 23, an image recognition unit 24, and an output I/F 25. The input I/F 21A and the input I/F 21B correspond to an input unit according to the present invention. The correction unit 22A and the correction unit 22B correspond to a correction unit according to the present invention.

The respective constituent elements of the image processing unit 20 may be achieved with circuits, or at least partially achieved with a processor such as a CPU that executes a program, and a memory.

The input I/F 21A and the input I/F 21B respectively including, for example, A/D (analog/digital) converters, convert taken image signals output from the image sensors 12A, 12B, to digital signals, and outputs the digital signals to the correction units 22A, 22B at the subsequent stage.

The correction units 22A, 22B respectively apply various types of image processing to the taken image signals output from the input I/F 21A and the input I/F 21B to correct the signals, and output the corrected signals to the stereo processing unit 23. The image processing executed by the correction units 22A, 22B is, for example, affine transformation processing, which can transform distorted taken images into a predetermined coordinate system (for example, cylindrical coordinate system). The image processing executed by the correction units 22A, 22B may include other processing, for example, demosaicing.

The stereo processing unit 23 executes stereo processing with the use of the taken images output from the correction units 22A, 22B, and outputs the processed images to the image recognition unit 24.

Specifically, the stereo processing unit 23 extracts range information by a known stereo method with the use of two images in regions (common visual fields) SC where the imaging region (visual field) SA of the imaging unit 10A and the imaging region (visual field) SB of the imaging unit 10B have an overlap with each other, and generates range image data.

In addition, as for a region (monocular visual field, non-common visual field) of the imaging region SA that has no overlap with the imaging region SB, the stereo processing unit 23 acquires two images at different positions and time points during the motion of the vehicle, extracts range information by a known motion stereo method with the use of the images, and generates range image data. Likewise, as for a region (monocular visual field, non-common visual field) of the imaging region SB that has no overlap with the imaging region SA, the stereo processing unit 23 acquires two images at different positions and time points during the motion of the vehicle, extracts range information by a known motion stereo method with the use of the images, and generates range image data. The motion stereo method is intended for stereoscopic viewing with the use of images obtained at two positions and time points by moving a camera, which is also referred to as a motion parallax method.

The stereo processing unit 23 generates range image data for all directions including the common visual field and the monocular visual fields and outputs the data to the image recognition unit 24 in the way described above. In addition, the stereo processing unit 23 also outputs, to the image recognition unit 24, the taken image data output from each of the imaging units 10A, 10B.

The image recognition unit 24 generates recognition information on the presence or absence, location, distance, and the like of an object such as vehicles, people, obstacles, signs, and traffic lights by image recognition of the object with the use of the range image data and taken image data output from the stereo processing unit 23, and outputs the recognition information to the output I/F 25. The image recognition unit 24 may output the range image data and the taken image data to the output I/F 25. For the image recognition, known image recognition techniques can be used.

The output I/F 25 outputs the recognition information and image data output from the image recognition unit 24 to a control unit such as an ECU.

FIG. 3 is a diagram for explaining examples of the installation and imaging regions of the imaging units 10A, 10B. FIG. 3 is a plan view of a vehicle V from the height direction. In FIG. 3, the vehicle V enlarged is shown on the upper side, and the vehicle V reduced in size and the visual field thereof in the horizontal direction are shown on the lower side.

The imaging direction of the imaging unit 10A is set toward the left-hand direction L of the vehicle V. The imaging direction of the imaging unit 10B is set toward the right-hand direction R of the vehicle V.

In this regard, the imaging region SA of the imaging unit 10A is considered divided into a left part SA1, a central part SA2, and a right part SA3, and the imaging region SB of the imaging unit 10B is considered divided into a left part SB1, a central part SB2, and a right part SB3. As described above, the imaging units 10A, 10B each have an angle of view in excess of 180 degrees. The right part SA3 and the left part SB1 are overlapped with each other to form a common part SC1 that covers the forward direction F of the vehicle V. In addition, the left part SA1 and the right part SB3 are overlapped with each other to form a common part SC2 that covers the backward direction B of the vehicle V. The central part SA2 forms a non-common part SA2 that covers the left-hand direction L of the vehicle V. The central part SB2 forms a non-common part SB2 that covers the right-hand direction R of the vehicle V.

As described above, for each of the common parts SC1, SC2, range information is generated by the use of the stereo method. On the other hand, for each of the central parts SA2, SB2, range information is generated by the use of the motion stereo method. It is to be noted that according to the present embodiment, the lenses in accordance with the stereographic projection method is used, thus making it possible to improve the resolutions of the regions for the forward direction F and backward direction B of the vehicle V with respect to the regions for the right-hand direction R and left-hand direction L of the vehicle V. In general, there is a need to detect faraway objects in the travelling direction (backward and forward) of a vehicle. As in the present embodiment, the resolution at a high angle of view is improved with the two lenses disposed, thereby making it possible to detect faraway objects in the travelling direction. In addition, the configuration according to the present embodiment can also achieve high-accuracy recognition in the travelling direction (backward and forward). In this way, it becomes possible to acquire range information in the visual field of the horizontal periphery of the vehicle V, and further image recognition becomes possible. According to the present embodiment, there is no need to install multiple stereo cameras which are typically more expensive than monocular cameras, and the cost can be thus reduced.

Figure 4:
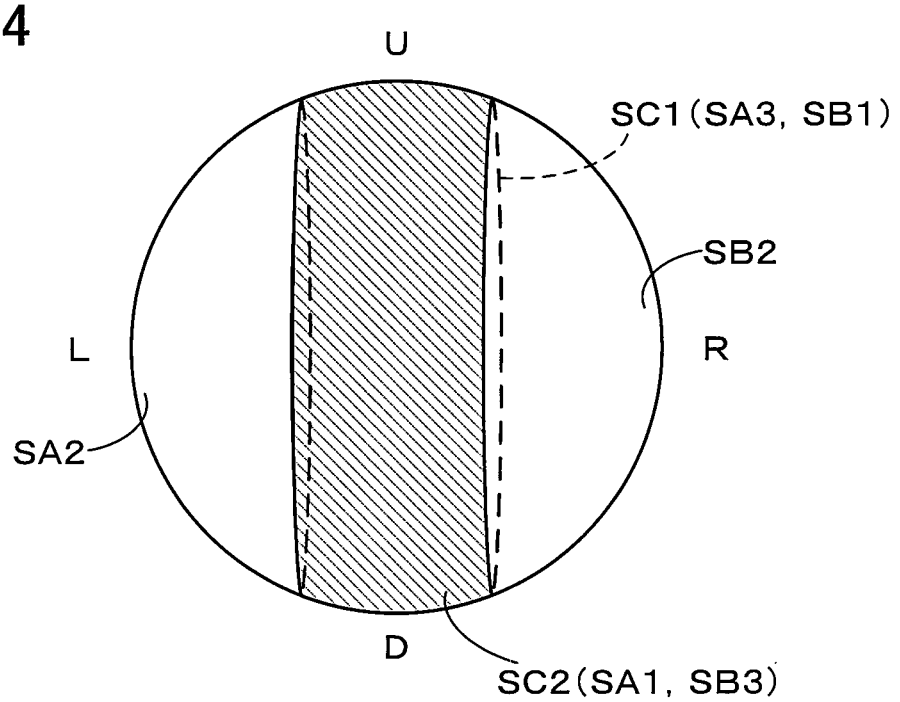
FIG. 4 is a diagram for explaining examples of the imaging direction and imaging region in the case of applying the first embodiment.

FIG. 4 is a diagram for explaining examples of the imaging direction and imaging region in the case of applying the first embodiment. In FIG. 4, the imaging region is indicated by a sphere, and the forward direction F, backward direction B, upward direction U, downward direction D, left-hand direction L, and right-hand direction R of the vehicle V respectively correspond to a back direction, a front direction, an upward direction, a downward direction, a left-hand direction, and a right-hand direction in the figure.

As can be seen from FIG. 4, among the respective curved imaging regions (central part SA2, central part SB2, common part SC1, and common pert SC2), a region around the axis in the vertical direction (UD) covers the visual field of horizontal periphery of the vehicle V.

Figure 5:
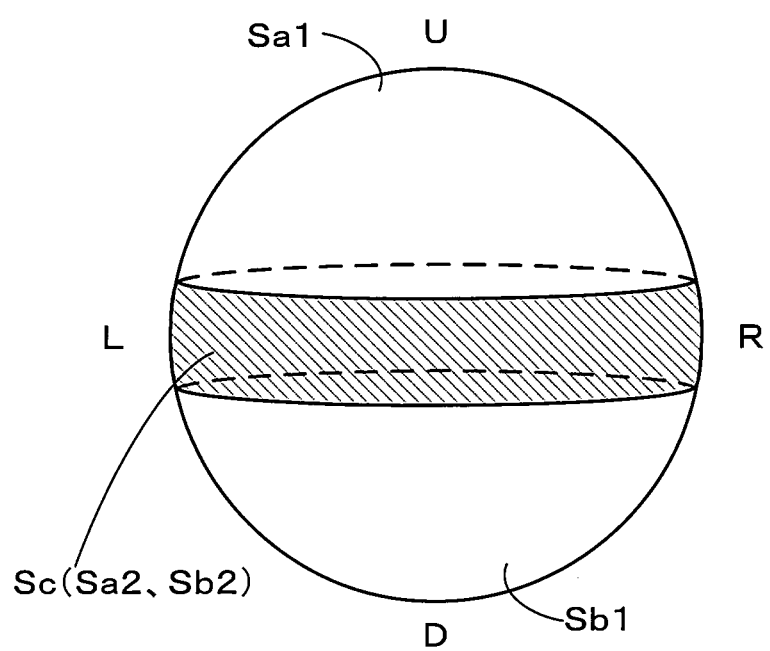
FIG. 5 is a diagram for explaining examples of the imaging direction and imaging region in the case of applying the related art.

FIG. 5 is a diagram for explaining examples of the imaging direction and imaging region in the case of applying the related art. In FIG. 5, the imaging region is indicated by a sphere.

In this regard, with the use of an imaging unit 10a and an imaging unit 10b which each have a curved mirror with an angle of view in excess of 180 degrees, the imaging direction of the imaging unit 10a is set toward the downward direction D of the vehicle V. The curved mirror of the imaging unit 10a is oriented in the upward direction U. The imaging direction of the imaging unit 10b is set toward the upward direction U of the vehicle V. The curved mirror of the imaging unit 10b is oriented in the downward direction D.

In this regard, the hemispherical imaging region Sa of the imaging unit 10a is considered divided into a central part Sa1 and an outer part Sa2, and the hemispherical imaging region Sb of the imaging unit 10b is considered divided into a central part Sb1 and an outer part Sab2. The band-shaped outer part Sa2 and outer part Sb2 are overlapped with each other to form a common part Sc that covers the left-handed, right-handed, forward, and backward directions L, R, F, B of the vehicle V. The central part Sa1 forms a non-common part that covers the upward direction U and left-handed, right-handed, forward, and backward directions L, R, F, B of the vehicle V. The central part Sb1 forms a non-common part that covers the downward direction D and left-handed, right-handed, forward, and backward directions L, R, F, B of the vehicle V.

As can be seen from FIG. 5, among the respective curved imaging regions (central part Sa1, central part Sb1, common part Sc), a region around the axis in the vertical direction (UD) covers the visual field of horizontal periphery of the vehicle V.

According to the related art, as a typically conceivable installation method, the imaging unit 10a and the imaging unit 10b are installed in the center of the roof of the vehicle V, and the roof of the vehicle V is thus captured in most of the imaging region of the lower hemisphere. In addition, the imaging unit 10a itself reflected at the curved mirror is captured in the center of the imaging region of the upper hemisphere, and the imaging unit 10b itself reflected at the curved mirror is captured in the center of the imaging region of the lower hemisphere.

In contrast, according to the present embodiment, as a typically conceivable installation method, the imaging unit 10A and the imaging unit 10B are installed on the right-hand side and left-hand side of the roof of the vehicle V as shown in FIG. 3, thus making it possible to reduce the roof area of the vehicle V, which is captured in the imaging region of the lower hemisphere. In addition, the imaging units 10A and 10B are not captured in the imaging region. For this reason, it is possible to make effective use of pixels of the image sensors.

Figure 6:
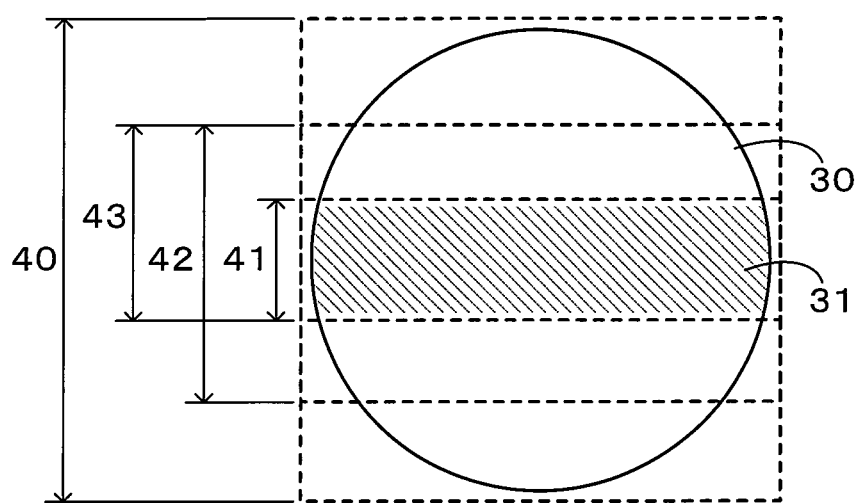
FIG. 6 is a diagram for explaining an image region example of a horizontal periphery projected onto an image sensor in the case of applying the first embodiment.

FIG. 6 is a diagram for explaining an image region example of the horizontal periphery projected onto the image sensor 12A or 12B in the case of applying the first embodiment.

The taken image 30 projected by the fish-eye lens is circular. Of the image corresponding to the horizontal periphery of the vehicle V, a notable region which is important in self-driving appears as a band-shaped region 31 (hatched region) of the taken image 30 in the center in the horizontal direction.

In self-driving, a taken image of the horizontal periphery of the vehicle V is essential in which an object is captured, but there is a reduced need for taken images of the vertical top and bottom in which, for example, the sky, a high building, the vehicle V itself, or the like is captured. Accordingly, it is enough to acquire a taken image of the notable region corresponding to the band-shaped region 31 near the center in the vertical direction.

In the case of acquiring the entire taken image 30 actually as taken image data, there is a need to set the two-dimensional size of the image sensor 12A, 12B in accordance with a size (reference numeral: 40) including the entire region of the taken image 30. However, in the case of acquiring only the band-shaped region 31 actually as taken image data, it is enough to set the two-dimensional size of the image sensor 12A, 12B in accordance with a size (reference numeral: 41) at least including the band-shaped region 31. More specifically, necessary information can be obtained with a smaller sensor size (at low cost).

In addition, in self-driving, there is a need for image recognition and automotive control in more real time. The smaller sensor size reduces the amount of image data, thus making it possible to reduce the load of image processing.

It is to be noted that the vertical dimension of the image sensor 12A, 12B may be set to be longer (reference numeral: 42) in the case of requiring a taken image of a region which is larger in width in the vertical direction than the band-shaped region 31. Alternatively, the vertical dimension and position of the image sensor 12A, 12B may be set depending on the desired width and position in the vertical direction. For example, in the case of requiring the taken image of an upper region more, the image sensors 12A, 12B may be also disposed on the upper side (reference numeral: 43). As just described, the configuration and installation of the imaging units 10A, 10B according to the present embodiment achieve the benefits of easily changing the design for the sizes and arrangement of the image sensors.

In addition, for example, in a case in which the vertical dimension of the image sensor 12A, 12B is set to be longer (reference numeral: 42), the vertical dimension of the detected region can be also freely changed within the detection range so as to include at least the band-shaped region 31. More specifically, the position of the required detected region can be selected depending on the situation.

Figure 7:
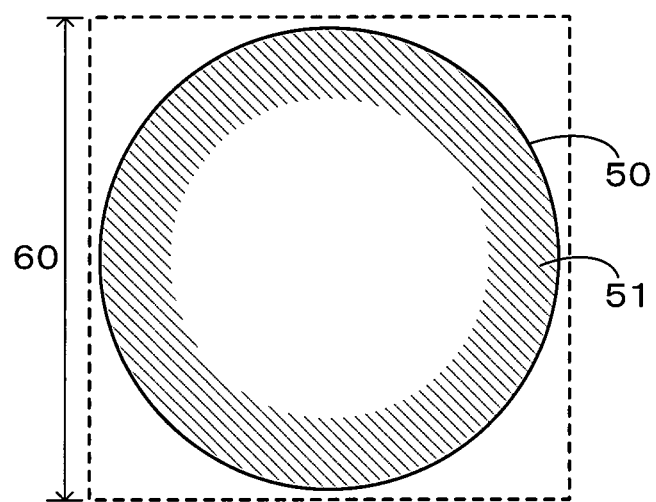
FIG. 7 is a diagram for explaining an image region example of a horizontal periphery projected onto the image sensor in the case of applying the related art.

FIG. 7 is a diagram for explaining an image region example of the horizontal periphery projected onto the image sensor in the case of applying the related art.

The taken image 50 projected by the curved mirror is circular. Of the image corresponding to the horizontal periphery of the vehicle V, a notable region which is important in self-driving appears as an annular region 51 (hatched region) of the taken image 50, which surrounds the central part.

In self-driving, a taken image of the horizontal periphery of the vehicle V is essential in which an object is captured, but there is a reduced need for taken images of the vertical top and bottom in which, for example, the sky, a high building, the vehicle V itself, or the like is captured. Accordingly, it is enough to acquire a taken image of the notable region corresponding to the annular region 51.

However, in the case of acquiring the entire annular region 51 as taken image data, there is a need to set the two-dimensional size of the image sensor in accordance with a size (reference numeral: 60) including the entire region of the taken image 50. More specifically, it is not possible to set the size of the image sensor to a smaller size, or it is not possible to reduce the amount of image data and the load of image processing. In addition, it is not possible to change the design for the sizes or arrangement of the image sensors. In addition, it is not possible to select the position of the required detected region depending on the situation.

Figure 8:
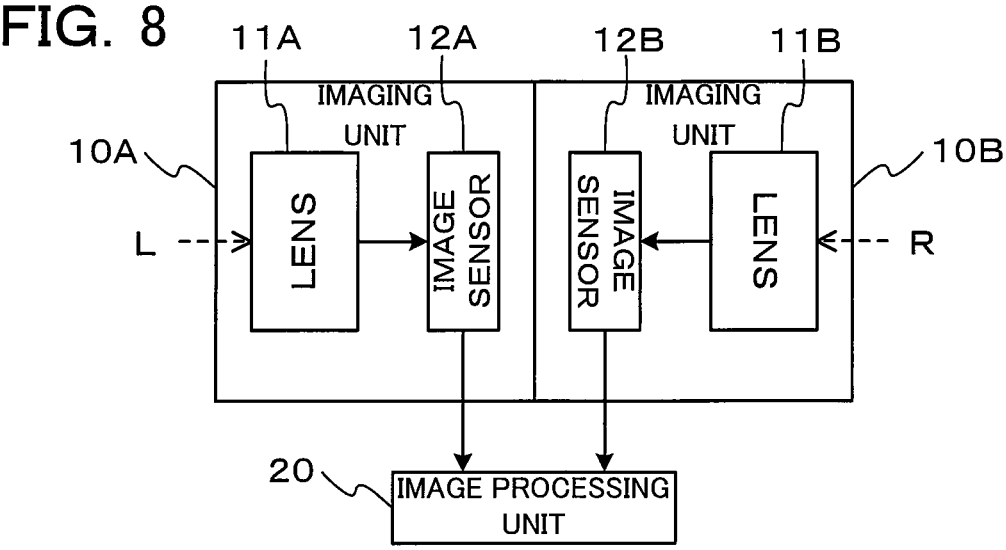
FIG. 8 is a block diagram illustrating a configuration example of an imaging unit.

FIG. 8 is a block diagram illustrating a configuration example of the imaging units 10A, 10B. The plane of incidence of the lens 11A and the light-receiving surface of the image sensor 12A are oriented in the left-hand direction L of the vehicle V. The plane of incidence of the lens 11B and the light-receiving surface of the image sensor 12B are oriented in the right-hand direction R of the vehicle V.

Figure 9:
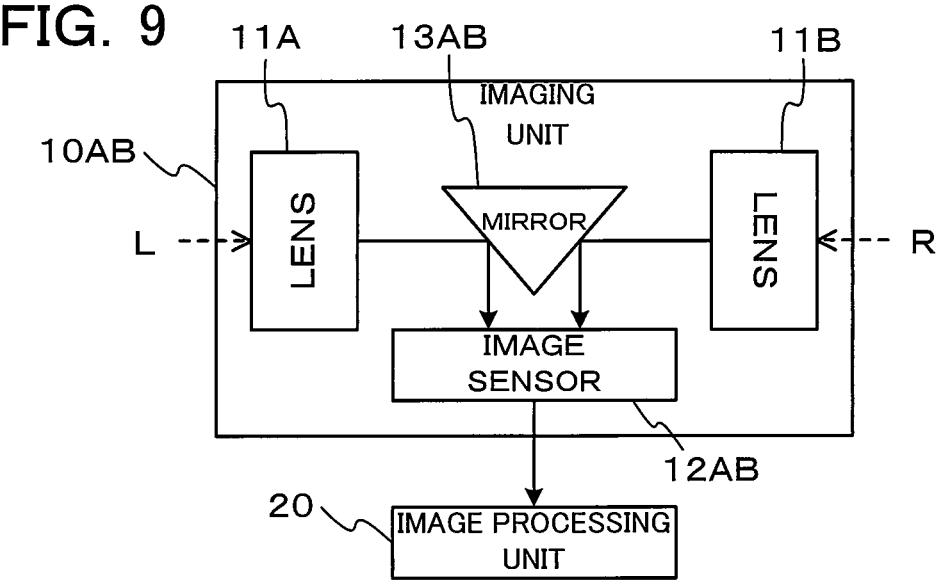
FIG. 9 is a block diagram illustrating another configuration example of an imaging unit.

FIG. 9 is a block diagram illustrating another configuration example of the imaging units 10A, 10B. The imaging unit 10A and the imaging unit 10B are configured as an imaging unit 10AB in integrated fashion. The imaging unit 10AB includes a lens 11A, a lens 11B, a mirror unit 13AB, and an image sensor 12AB.

The lenses 11A, 11B are respectively oriented in the left-hand direction L and the right-hand direction R. The mirror unit 13AB includes a reflecting surface that reflects light outgoing from the lens 11A and then guides the light to the image sensor 12AB, and a reflecting surface that reflects light outgoing from the lens 11B and then guides the light to the image sensor 12AB. The image sensor 12AB is composed of an image sensor substrate, which includes a detection region that receives the light from the lens 11A, which is reflected at the mirror unit 13AB, and a detection region that receives the light from the lens 11B, which is reflected at the mirror unit 13AB.

It is to be noted that in the case of using the imaging unit 10AB, the image processing unit 20 extracts, from taken images output from the image sensor 12AB, images corresponding to the respective detection regions, and executes image processing for each of the extracted images.

The imaging units 10A, 10B in FIG. 8 use the two image sensors, whereas the imaging unit 10AB shown in FIG. 9 uses only the image sensor. The reduction in the number of image sensors leads to not only a reduction in the cost for preparing the image sensor, but also reduced wiring, a reduction in circuit size, and the like.

The first embodiment of the present invention has been described above. According to the first embodiment, three-dimensional sensing of the horizontal periphery can be achieved at low cost. It is to be noted that the motion stereo method is used for the central parts SA2, SB2 in the present embodiment, but the detection method is not limited. For example, even when an object is detected with the use of a technique such as AI (Artificial Intelligence), a similar effect is produced.

Second Embodiment

According to the second embodiment, imaging units 10D, 10E that serve as monocular cameras and an imaging unit 10F that serves as a stereo camera are used. The differences from the first embodiment will be mainly described below.

The imaging units 10D, 10E may have an angle of view of 180 degrees or more, or an angle of view of less than 180 degrees. The imaging unit 10F, which serves as a common stereo camera, has an angle of view of less than 180 degrees.

The image processing unit 20 includes input I/Fs and correction units to correspond respectively to the imaging units 10D, 10E, 10F. The stereo processing unit 23 extracts range information by a known stereo method, for common visual fields between taken images from the imaging units 10D, 10E. In addition, the stereo processing unit 23 extracts range information by a known motion stereo method, for monocular visual fields of the taken images from the imaging units 10D, 10E. In addition, the stereo processing unit 23 extracts range information by a known stereo method, for a common visual field of a taken image from the imaging unit 10F.

The stereo processing unit 23 generates range image data for all directions in the way described above, and outputs the data to the image recognition unit 24. In addition, the stereo processing unit 23 also outputs, to the image recognition unit 24, the taken image data output from each of the imaging units 10D, 10E, 10F.

FIG. 10 is a diagram for explaining examples of the installation and imaging regions of the imaging units 10D, 10E, 10F according to the second embodiment.

The imaging direction of the imaging unit 10D is set toward the backward left direction LB of the vehicle V. The imaging direction of the imaging unit 10E is set toward the backward right direction RB of the vehicle V. The imaging direction of the imaging unit 10F is set toward the forward direction F of the vehicle V.

In this regard, the imaging region SD of the imaging unit 10D is considered divided into a left part SD1 and a right part SD2, and the imaging region SE of the imaging unit 10E is considered divided into a left part SE1 and a right part SE2. The left part SD1 and the right part SE2 are overlapped with each other to form a common part SC2 that covers the backward direction B of the vehicle V. The imaging region SF of the imaging part 10F forms a common part SC1 that covers the forward direction F of the vehicle V. The right part SD2 forms a non-common part SD2 that covers the left-hand direction L of the vehicle V. The left part SE1 forms a non-common part SE1 that covers the right-hand direction R of the vehicle V.

It is to be noted that an end of the imaging region SD is adjacent to an end of the imaging region SF in FIG. 10, but the regions may be adapted to have an overlap with each other. The same applies to an end of the imaging region SE and an end of the imaging region SF.

According to the second embodiment, as compared with the first embodiment, the stereo camera (imaging unit 10F) is added, but lenses that are smaller in angle of view can be used for the two monocular cameras (imaging units 10D, 10E). This configuration can reduce distortions at ends of taken images shot by fish-eye lenses. In addition, the proportion of the common visual fields to the visual field in all directions can be increased, thus reducing the region to which the motion stereo method is applied, and then making it possible to generate highly precise three-dimensional images. In addition, there is no need to install two or more stereo cameras which are generally more expensive than monocular cameras, thus making it possible to keep cost low.

Third Embodiment

According to the third embodiment, imaging units 10G, 10H, 10I that serve as monocular cameras are used. The differences from the first embodiment will be mainly described below.

The imaging units 10G, 10H, 10I may have an angle of view of 180 degrees or more, or an angle of view of less than 180 degrees.

The image processing unit 20 includes input I/Fs and correction units to correspond respectively to the imaging units 10G, 10H, 10I. The stereo processing unit 23 extracts range information by a known stereo method, for common visual fields between taken images from the imaging units 10G, 10H, 10I. In addition, the stereo processing unit 23 extracts range information by a known motion stereo method, for monocular visual fields of the taken images from the imaging units 10G, 10H, 10I.

The stereo processing unit 23 generates range image data for all directions in the way described above, and outputs the data to the image recognition unit 24. In addition, the stereo processing unit 23 also outputs, to the image recognition unit 24, the taken image data output from each of the imaging units 10G, 10H, 10I.

FIG. 11 is a diagram for explaining examples of the installation and imaging regions of the imaging units 10G, 10H, 10I according to the third embodiment.

The imaging direction of the imaging unit 10G is set toward the forward left direction LF of the vehicle V. The imaging direction of the imaging unit 10H is set toward the forward right direction RF of the vehicle V. The imaging direction of the imaging unit 10I is set toward the backward direction B of the vehicle V.

In this regard, the imaging region SG of the imaging unit 10G is considered divided into a left part SG1, a central part SG2, and a right part SG3, the imaging region SH of the imaging unit 10H is considered divided into a left part SH1, a central part SH2, and a right part SH3, and the imaging region SI of the imaging unit 10I is considered divided into a left part SI1 and a right part SI2. The right part SG3 and the left part SH1 are overlapped with each other to form a common part SC1 that covers the forward direction F of the vehicle V. The left part SG1 and the right part SI2 are overlapped with each other to form a common part SC2 that covers the backward left direction LB of the vehicle V. The right part SH3 and the left part SI1 are overlapped with each other to form a common part SC3 that covers the backward right direction RB of the vehicle V. The central part SG2 forms a non-common part SG2 that covers the left-hand direction L of the vehicle V. The central part SH2 forms a non-common part SH2 that covers the right-hand direction R of the vehicle V. The configuration according to the present embodiment adopts lens which have high resolution in high angle of view for the lenses of the imaging unit 10H and imaging unit 10G, and adopts a lens which has high resolution in central angle of view for the lens of the imaging unit 10I, thereby allowing for detection at long range in the rear of the vehicle V. In addition, the present configuration can also achieve high-accuracy recognition in the rear of the vehicle V.

According to the third embodiment, as compared with the first embodiment, one more monocular camera is provided, but lenses that are smaller in angle of view can be used for the three monocular cameras (imaging units 10G, 10H, 10I). This configuration can reduce distortions at ends of taken images shot by fish-eye lenses. In addition, the proportion of the common visual fields to the visual field in all directions can be increased, thus reducing the region to which the motion stereo method is applied, and then making it possible to generate highly precise three-dimensional images. In addition, there is no need to install multiple stereo cameras which are generally more expensive than monocular cameras, thus making it possible to keep cost low.

As a modification example of the third embodiment, the angle of view for the imaging unit 10I may be increased, thereby adapting the left part SG1 and the central part SG2, and the right part SI2 to be overlapped with each other to form a common part SC2 that covers the left-hand direction L and backward left direction LB of the vehicle V, and adapting the central part SH2 and the right part SH3, and the left part SI1 to be overlapped with each other to form a common part SC3 that covers the right-hand direction R and backward right direction RB of the vehicle V. According to this modification example, three-dimensional images can be generated just by the stereo method without using the motion stereo method.

Fourth Embodiment

According to the fourth embodiment, imaging units 10J, 10K, 10L that serve as monocular cameras and an imaging unit 10M that serves as a stereo camera are used. The differences from the first embodiment will be mainly described below.

The imaging units 10J, 10K, 10L may have an angle of view of 180 degrees or more, or an angle of view of less than 180 degrees. The imaging unit 10M, which serves as a common stereo camera, has an angle of view of less than 180 degrees.

The image processing unit 20 includes input I/Fs and correction units to correspond respectively to the imaging units 10J, 10K, 10L, 10M. The stereo processing unit 23 extracts range information by a known stereo method, for common visual fields between taken images from the imaging units 10J, 10K, 10L. In addition, the stereo processing unit 23 extracts range information by a known motion stereo method, for monocular visual fields of the taken images from the imaging units 10J, 10K, 10L. In addition, the stereo processing unit 23 extracts range information by a known stereo method, for a common visual field of a taken image from the imaging unit 10M.

The stereo processing unit 23 generates range image data for all directions in the way described above, and outputs the data to the image recognition unit 24. In addition, the stereo processing unit 23 also outputs, to the image recognition unit 24, the taken image data output from each of the imaging units 10J, 10K, 10L, 10M.

FIG. 12 is a diagram for explaining examples of the installation and imaging regions of the imaging units 10J, 10K, 10L, 10M according to the fourth embodiment.

The imaging direction of the imaging unit 10J is set toward the backward left direction LB of the vehicle V. The imaging direction of the imaging unit 10K is set toward the backward right direction RB of the vehicle V. The imaging direction of the imaging unit 10L is set toward the backward direction B of the vehicle V. The imaging direction of the imaging unit 10M is set toward the forward direction F of the vehicle V.

In this regard, the imaging region SJ of the imaging unit 10J is considered divided into a left part SJ1 and a right part SJ2, the imaging region SK of the imaging unit 10K is considered divided into a left part SK1 and a right part SK2, and the imaging region SL of the imaging unit 10L is considered divided into a left part SL1 and a right part SL2. The right part SL2 and the left part SJ1 are overlapped with each other to form a common part SC2 that covers the backward left direction LB of the vehicle V. The left part SL1 and the right part SK2 are overlapped with each other to form a common part SC3 that covers the backward right direction RB of the vehicle V. The imaging region SM forms a common part SC1 that covers the forward direction F of the vehicle V. The right part SJ2 forms a non-common part SJ2 that covers the forward left direction LF of the vehicle V. The left part SK1 forms a non-common part SK1 that covers the forward right direction RF of the vehicle V.

It is to be noted that an end of the imaging region SJ is adjacent to an end of the imaging region SM in FIG. 12, but the regions may be adapted to have an overlap with each other. The same applies to an end of the imaging region SK and an end of the imaging region SM. The configuration according to the present embodiment adopts lens which have high resolution in high angle of view for the lenses of the imaging unit 10J and imaging unit 10K, and adopts a lens which has high resolution in central angle of view for the lens of the imaging unit 10L, thereby allowing for detection at long range in the rear of the vehicle V. In addition, the present configuration can also achieve high-accuracy recognition in the rear of the vehicle V.

According to the fourth embodiment, as compared with the first embodiment, one more monocular camera is provided, and the stereo camera (imaging unit 10M) is added. Thus, lenses that are smaller in angle of view can be used for the three monocular cameras (imaging units 10J, 10K, 10L). This configuration can reduce distortions at ends of taken images shot by fish-eye lenses. In addition, the proportion of the common visual fields to the visual field in all directions can be increased, thus reducing the region to which the motion stereo method is applied, and then making it possible to generate highly precise three-dimensional images. In addition, there is no need to install two or more stereo cameras which are generally more expensive than monocular cameras, thus making it possible to keep cost low.

As a modification example of the fourth embodiment, the angle of view for the imaging unit 10L may be increased, thereby adapting the left part SJ1 and the right part SJ2, and the right part SL2 to be overlapped with each other to form a common part SC2 that covers the forward left direction LF and backward left direction LB of the vehicle V, and adapting the left part SK1 and the right part SK2, and the left part SL1 to be overlapped with each other to form a common part SC3 that covers the forward right direction RF and backward right direction RB of the vehicle V. According to this modification example, three-dimensional images can be generated just by the stereo method without using the motion stereo method.

Fifth Embodiment

According to the fifth embodiment, imaging units 10N, 10O, 10P, 10Q that serve as monocular cameras are used. The differences from the first embodiment will be mainly described below.

The imaging units 10N, 10O, 10P, 10Q may have an angle of view of 180 degrees or more, or an angle of view of less than 180 degrees.

The image processing unit 20 includes input I/Fs and correction units to correspond respectively to the imaging units 10N, 10O, 10P, 10Q. The stereo processing unit 23 extracts range information by a known stereo method, for common visual fields between taken images from the imaging units 10N, 10O, 10P, 10Q. In addition, the stereo processing unit 23 extracts range information by a known motion stereo method, for monocular visual fields of the taken images from the imaging units 10N, 10O, 10P, 10Q.

The stereo processing unit 23 generates range image data for all directions in the way described above, and outputs the data to the image recognition unit 24. In addition, the stereo processing unit 23 also outputs, to the image recognition unit 24, the taken image data output from each of the imaging units 10N, 10O, 10P, 10Q.

FIG. 13 is a diagram for explaining examples of the installation and imaging regions of the imaging units 10N, 10O, 10P, 10Q according to the fifth embodiment.

The imaging direction of the imaging unit 10N is set toward the forward left direction LF of the vehicle V. The imaging direction of the imaging unit 10O is set toward the forward right direction RF of the vehicle V. The imaging direction of the imaging unit 10P is set toward the backward right direction RB of the vehicle V. The imaging direction of the imaging unit 10Q is set toward the backward left direction LB of the vehicle V.

In this regard, the imaging region SN of the imaging unit 10N is considered divided into a left part SN1 and a right part SN2, the imaging region SO of the imaging unit 10O is considered divided into a left part SO1 and a right part SO2, the imaging region SP of the imaging unit 10P is considered divided into a left part SP1 and a right part SP2, and the imaging region SQ of the imaging unit 10Q is considered divided into a left part SQ1 and a right part SQ2. The right part SN2 and the left part SO1 are overlapped with each other to form a common part SC1 that covers the forward direction F of the vehicle V. The right part SP2 and the left part SQ1 are overlapped with each other to form a common part SC2 that covers the backward direction B of the vehicle V. The left part SN1 forms a non-common part SN1 that covers the forward left direction LF of the vehicle V. The right part SO2 forms a non-common part SO2 that covers the forward right direction RF of the vehicle V. The left part SP1 forms a non-common part SP1 that covers the backward right direction RB of the vehicle V. The right part SQ2 forms a non-common part SQ2 that covers the backward left direction LB of the vehicle V.

It is to be noted that an end of the imaging region SN is adjacent to an end of the imaging region SQ in FIG. 13, but the regions may be adapted to have an overlap with each other. The same applies to an end of the imaging region SO and an end of the imaging region SP.

According to the fifth embodiment, as compared with the first embodiment, two more monocular cameras are provided, but lenses that are smaller in angle of view can be used for the four monocular cameras (imaging units 10N, 10O, 10P, 10Q). This configuration can reduce distortions at ends of taken images shot by fish-eye lenses. In addition, the proportion of the common visual fields to the visual field in all directions can be increased, thus reducing the region to which the motion stereo method is applied, and then making it possible to generate highly precise three-dimensional images. In addition, there is no need to install multiple stereo cameras which are generally more expensive than monocular cameras, thus making it possible to keep cost low.

As a modification example of the fifth embodiment, the angles of view for the imaging unit 10N and the imaging unit 10Q may be increased, thereby adapting the left part SN1 and the right part SQ2 to be overlapped with each other to form a common part that covers the left-hand direction L of the vehicle V, and furthermore, the angles of view for the imaging unit 10O and the imaging unit 10P may be increased, thereby adapting the right part SO2 and the left part SP1 to be overlapped with each other to form a common part that covers the right-hand direction R of the vehicle V. According to this modification example, three-dimensional images can be generated just by the stereo method without using the motion stereo method.

The present invention has been described above with reference to the several embodiments. Obviously, the present invention is not to be considered limited to the embodiments mentioned above, but intended to encompass various modification examples.

While the multiple imaging units and the image processing unit are regarded as a three-dimensional image processing device according to each of the embodiments described above, the image processing unit excluding the multiple imaging units may be regarded as a three-dimensional image processing device. In addition, while the image recognition unit is included in the image processing unit according to each of the embodiments described above, the image recognition unit may be disposed on the vehicle side. In this case, the stereo processing unit outputs information such as image data via the output I/F to the vehicle side.

In addition, the configurations such as the arrangement, dimensions, and shapes of the respective constituent elements of the three-dimensional image processing device are not limited to the examples described above or illustrated, as long as the object of the present invention can be achieved. In addition, the terms to describe the relations, positions, directions, and the like of the constituent elements, such as terms "horizontal", "vertical", "perpendicular", and "planar", are not limited to the literally exact meanings, as long as the object and advantageous effect of the present invention can be achieved, but allowed to encompass also cases substantially equivalent to the meanings.

In addition, the embodiments mentioned above have been described in detail for clearly explaining the present invention, but are not necessarily to be considered limited to the inclusion of all of the configurations described. In addition, it is possible to replace a part of a configuration according to an embodiment with a configuration according to another embodiment, and it is also possible to add a configuration according to an embodiment to a configuration according to another embodiment. In addition, it is possible to add/ remove/substitute another configuration to/from/for a part of the configuration according to each embodiment.

In addition, the respective configurations, functions, processing units, processing means, etc. mentioned above may be partially or entirely achieved with hardware, for example, by designing with integrated circuits. In addition, the respective configurations, functions, etc. mentioned above may be achieved with software in a way that a processor interprets and executes programs for achieving the respective functions. Information such as programs, tables, and files for achieving the respective functions can be stored on recording devices such as memories, hard disks, SSD (Solid State Drive), or recording media such as IC cards, SD cards, and DVDs (Digital Versatile Disc).

In addition, the control lines and information lines are shown which are considered required for the sake of explanation, but all of the control lines and information lines required for a product are not always shown. In fact, it is conceivable the almost all of the configurations are inter-connected.

The present invention is not limited to any three-dimensional image processing device, but can be provided in various aspects such as a three-dimensional image processing method, a computer-readable program and, a vehicle equipped with a three-dimensional image processing device.

What is claimed is:

1. A three-dimensional image processing device comprising:
at least one input interface which receives a first taken image and a second taken image respectively from a first imaging unit and a second imaging unit; and
a processor configured to execute stereo processing and then output a range image for a common part where an imaging region of the first taken image and an imaging region of the second taken image overlap with each other,
wherein an imaging direction of the first imaging unit and an imaging direction of the second imaging unit are set toward a horizontal direction,
wherein a central part of an imaging region of the first imaging unit and a central part of an imaging region of the second imaging unit are set as non-common parts that do not overlap each other, and wherein both side parts of the imaging region of the first imaging unit and both side parts of the imaging region of the second imaging unit are set as the common part, wherein the processor executes motion stereo processing and outputs a range image for each of the central part of the imaging region of the first imaging unit and the central part of the imaging region of the second imaging unit, wherein an image recognition unit configured to recognize an object by use of each of the range image output through the stereo processing and the range image output through the motion stereo processing, and wherein the first imaging unit and the second imaging unit are installed in a vehicle, wherein the imaging direction of the first imaging unit is set toward a transverse direction of the vehicle, and wherein the imaging direction of the second imaging unit is set toward a transverse direction of the vehicle, the transverse direction opposite to the imaging direction of the first imaging unit.

2. The three-dimensional image processing device according to claim 1,
wherein the first imaging unit and the second imaging unit each comprise a fish-eye lens that has an angle of view in excess of 180 degrees.

3. The three-dimensional image processing device according to claim 2,
wherein the fish-eye lens has a projection method in which a resolution in a region that is larger in angle of view is higher with respect to a resolution in a region that is smaller in angle of view.

4. The three-dimensional image processing device according to claim 1, comprising:
the first imaging unit and the second imaging unit.

5. The three-dimensional image processing device according to claim 4,
wherein the first imaging unit and the second imaging unit comprise respective lenses, an image sensor, and a mirror unit configured to reflect light passing through the respective lenses toward the image sensor.

6. A three-dimensional image processing device comprising:
at least one input interface which receives a first taken image, a second taken image, and a third taken image respectively from a first imaging unit, a second imaging unit, and a third imaging unit; and a processor configured to execute stereo processing and then output a range image for common parts where an imaging region of the first taken image, an imaging region of the second taken image, and an imaging region of the third taken image overlap with each other, wherein an imaging direction of the first imaging unit, an imaging direction of the second imaging unit, and an imaging direction of the third imaging unit are set toward a horizontal direction, wherein a part of an imaging region of the first imaging unit and a part of an imaging region of the second imaging unit are set as the common parts, and wherein the other region of the imaging region of the first imaging unit and a part of an imaging region of the third imaging unit are set as the common parts, wherein the processor executes motion stereo processing and outputs a range image for each of the central part of the imaging region of the first imaging unit and the central part of the imaging region of the second imaging unit, wherein an image recognition unit configured to recognize an object by use of each of the range image output through the stereo processing and the range image output through the motion stereo processing, and wherein the first imaging unit and the second imaging unit are installed in a vehicle, wherein the imaging direction of the first imaging unit is set toward a transverse direction of the vehicle, and wherein the imaging direction of the second imaging unit is set toward a transverse direction of the vehicle, the transverse direction opposite to the imaging direction of the first imaging unit.

7. The three-dimensional image processing device according to claim 6,
wherein the processor motion stereo processing and then outputs a range image, for each of another part of the imaging region of the second imaging unit and another part of the imaging region of the third imaging unit.

8. A three-dimensional image processing method,
wherein an imaging direction of a first imaging unit and an imaging direction of a second imaging unit are set toward a horizontal direction, a central part of an imaging region of the first imaging unit and a central part of an imaging region of the second imaging unit are set as non-common parts that have no overlap with each other, both side parts of the imaging region of the first imaging unit and both side parts of the imaging region of the second imaging unit are set as common parts that overlap with each other, a first taken image and a second taken image are acquired respectively from the first imaging unit and the second imaging unit, and for the common parts between an imaging region of the first taken image and an imaging region of the second taken image, stereo processing is executed to output a range image, for each of the central part of the imaging region of the first imaging unit and the central part of the imaging region of the second imaging unit, motion stereo processing is executed to output a range image, an object is recognized by use of each of the range image output through the stereo processing and the range image output through the motion stereo processing, and wherein the first imaging unit and the second imaging unit are installed in a vehicle, wherein the imaging direction of the first imaging unit is set toward a transverse direction of the vehicle, and wherein the imaging direction of the second imaging unit is set toward a transverse direction of the vehicle, the transverse direction opposite to the imaging direction of the first imaging unit.

* * * * *